United States Patent
Okagawa et al.

(10) Patent No.: US 6,948,340 B2
(45) Date of Patent: Sep. 27, 2005

(54) METHOD OF PRODUCING AN ELLIPTIC CORE OPTICAL FIBER

(75) Inventors: Shuji Okagawa, Utsunomiya (JP); Hideo Kato, Kawachi-gun (JP); Kenji Yagi, Yokohama (JP)

(73) Assignee: Moritex Corporation, Tokyo (JP)

( * ) Notice: Subject to any disclaimer, the term of this patent is extended or adjusted under 35 U.S.C. 154(b) by 194 days.

(21) Appl. No.: 10/097,867

(22) Filed: Mar. 15, 2002

(65) Prior Publication Data

US 2002/0162361 A1 Nov. 7, 2002

(30) Foreign Application Priority Data

Mar. 22, 2001 (JP) ........................................ 2001-083011

(51) Int. Cl.[7] .............................................. C03B 3/027
(52) U.S. Cl. .......................................... 65/403; 65/435
(58) Field of Search .................... 65/403, 435; 385/146

(56) References Cited

U.S. PATENT DOCUMENTS

| | | | | |
|---|---|---|---|---|
| 4,354,736 A | * | 10/1982 | Maklad et al. | 385/125 |
| 4,717,225 A | * | 1/1988 | Feth et al. | 385/11 |
| 5,067,793 A | * | 11/1991 | Bachmann et al. | 385/127 |
| 5,482,525 A | * | 1/1996 | Kajioka et al. | 65/398 |

FOREIGN PATENT DOCUMENTS

| | | | | |
|---|---|---|---|---|
| GB | 2012983 A | * | 8/1979 | ............ G02B/5/14 |
| GB | 2221903 A | * | 2/1990 | ......... C03B/37/023 |
| WO | WO 9740408 A2 | * | 10/1997 | |

OTHER PUBLICATIONS

Kabeel, M.A., Measurement of Refractive Indices of Fibers With Regular or Irregualr Transverse Sections and Having a Skin–Core Structure, Dec., 1991, Review of Scientific Instruments vol. 62 Issue 12, pp. 2950–2954.*

* cited by examiner

*Primary Examiner*—Steven P. Griffin
*Assistant Examiner*—Carlos Lopez
(74) *Attorney, Agent, or Firm*—Townsend & Banta

(57) ABSTRACT

Disclosed is a method of producing an elliptic core optical fiber, in which a original preform having a circular core disposed at the center of a circular clad is processed to flatten on its periphery to form a processed preform that is then drawn with heating into an elliptic core optical fiber.

According to the invention, the form of the processed preform used for producing an elliptic core optical fiber with desired specific dimensions can be designed using pre-obtained correlations based on the dimensions of the elliptic core optical fiber. If the processed preform designed like this is drawn with heating, an elliptic core optical fiber with desired specific dimensions can be reliably and easily produced.

32 Claims, 7 Drawing Sheets

FIG. 3

| PROCESSED PREFORM (mm) | | | ELLIPTIC CORE OPTICAL FIBER (μm) | | | | | VALUE |
|---|---|---|---|---|---|---|---|---|
| r | c | x | | f | a | b | a/b | n |
| 20.0 | 8.00 | 11.00 | DV | 62.5 | 50.8 | 18.6 | 2.73 | 1.69 |
| | | | MV | 62.5 | 48.4 | 17.7 | 2.73 | |
| 11.44 | 3.21 | 5.58 | DV | 62.5 | 46.9 | 11.0 | 4.26 | 2.02 |
| | | | MV | 62.5 | 44.7 | 10.5 | 4.26 | |
| 11.44 | 3.21 | 5.90 | DV | 62.5 | 42.6 | 11.5 | 3.70 | 1.98 |
| | | | MV | 62.5 | 41.0 | 11.0 | 3.73 | |
| 11.47 | 1.54 | 6.27 | DV | 62.5 | 19.8 | 5.4 | 3.67 | 2.15 |
| | | | MV | 62.5 | 19.7 | 5.4 | 3.65 | |
| 11.47 | 1.55 | 7.10 | DV | 62.5 | 15.9 | 6.1 | 2.61 | 2.00 |
| | | | MV | 62.5 | 16.9 | 6.7 | 2.52 | |

DV : DESIRED VALUE   MV : MEASURED VALUE

F I G. 5
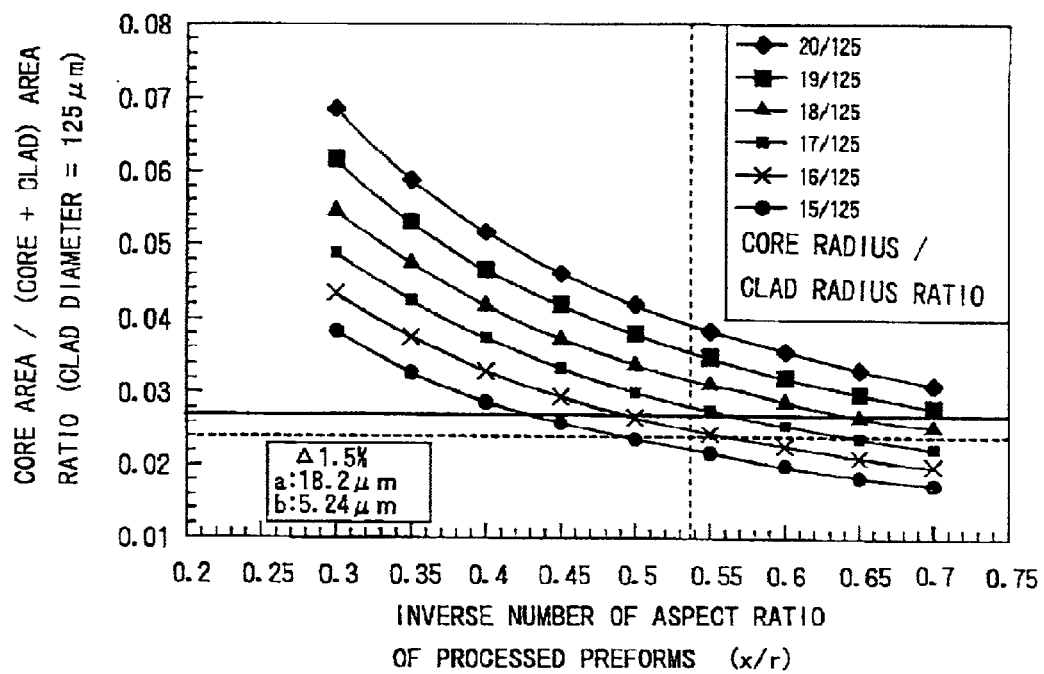
F I G. 6
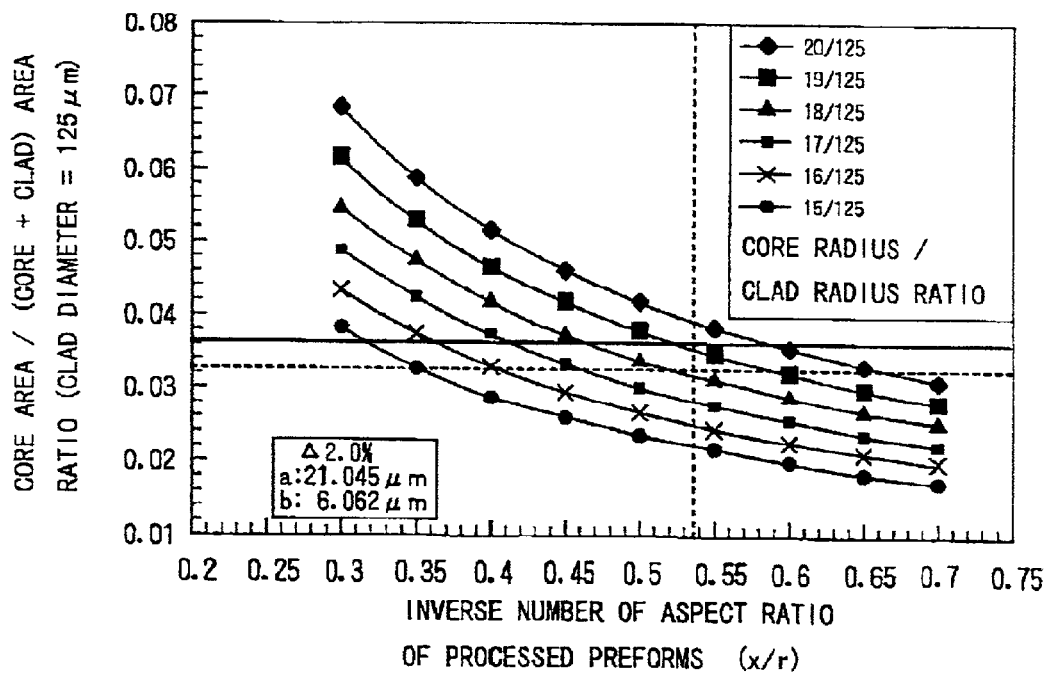

| ELLIPTIC CORE OPTICAL FIBER (Δ1.5%) | | CORRESPONDING PROCESSED PREFORM | |
|---|---|---|---|
| SEMIMAJOR AXIS a (μm) | 18.2 | | |
| SEMIMINOR AXIS b (μm) | 5.24 | | |
| ASPECT RATIO a/b | 3.47 | INVERSE NUMBER OF THE ASPECT RATIO x / r | 0.537 |
| CORE AREA/(CORE+CLAD) AREA RATIO | 0.024414 | CORE RADIUS / CLAD RADIUS RATIO | 16/125 |
| CORE AREA/(CORE+CLAD) AREA RATIO / 0.9 | 0.027127 | | |

(b)

| ELLIPTIC CORE OPTICAL FIBER (Δ2.0%) | | CORRESPONDING PROCESSED PREFORM | |
|---|---|---|---|
| SEMIMAJOR AXIS a (μm) | 21.045 | | |
| SEMIMINOR AXIS b (μm) | 6.062 | | |
| ASPECT RATIO a/b | 3.47 | INVERSE NUMBER OF THE ASPECT RATIO x / r | 0.537 |
| CORE AREA/(CORE+CLAD) AREA RATIO | 0.032659 | CORE RADIUS / CLAD RADIUS RATIO | 19/125 |
| CORE AREA/(CORE+CLAD) AREA RATIO / 0.9 | 0.036288 | | |

FIG. 8

| PROCESSED PREFORM | | GI TYPE ELLIPTIC CORE OPTICAL FIBER (Δ1.5%) | |
|---|---|---|---|
| CLAD RADIUS r | 11.47 (mm) | SEMIMAJOR AXIS a | 19.7 (μm) |
| CORE RADIUS c | 1.545 (mm) | SEMIMINOR AXIS b | 5.4 (μm) |
| HALF WIDTH OF THE PORTION GROUND IN PARALLEL x | 6.31 (mm) | ASPECT RATIO (a/b) | 3.65 |
| CORE AREA/(CORE+CLAD) AREA RATIO | 0.02736 | CORE AREA/(CORE+CLAD) AREA RATIO | 0.02735 |

US 6,948,340 B2

METHOD OF PRODUCING AN ELLIPTIC CORE OPTICAL FIBER

FIELD OF THE INVENTION

The present invention relates to a method of producing an elliptic core optical fiber with desired dimensions, and a original preform used for the method.

BACKGROUND OF THE INVENTION

An elliptic core optical fiber is known as a polarization maintaining optical fiber.

The elliptic core optical fiber was developed, since an ordinary single-mode optical fiber is likely to be disturbed in mode conversion and polarization state, being affected by feeble disturbances (e.g., temperature, pressure, vibration, etc.), and therefore is less likely to allow the propagation of light with its phase information and polarization state stably kept.

The propagation constant difference $\Delta\beta=\beta x-\beta y$ between intrinsic cross polarization modes of an ideal single-mode optical fiber is 0, but that of an actual optical fiber is not 0 since the core is not completely round and is non-uniformly strained.

Because of the natural birefringence, there is a problem that mode conversion is likely to occur between the polarization mode in x direction and the polarization mode in y direction that propagate at slightly different velocities in the optical fiber.

Therefore, the propagation constant difference $\Delta\beta$ between two cross polarization modes is made larger to render the mode conversion less likely to occur, for preventing the polarization state from being disturbed by feeble disturbances, thereby improving the properties of the single-mode optical fiber. This is a polarization maintaining optical fiber.

As a method of producing an elliptic core optical fiber used as such a polarization maintaining optical fiber, known is a method comprising the steps of grinding the periphery of a original preform having a sectionally circular core disposed at the center of a sectionally circular clad, along the parallel chords equally spaced from the central line of the original preform, to produce a processed preform, and drawing the processed preform with heating. (See JP, 6-235838, A.)

In this method, if a original preform is ground along the parallel chords equally spaced from the central line of the original preform and drawn with heating, an optical fiber can be spun from the tip of the molten preform.

In this case, in the molten portions, the portions ground in parallel of the clad are swollen relatively to the circular arc portions due to the surface tension acting on the surface of the optical fiber, making the optical fiber sectionally circular as a whole. Consequently, the circular core is deformed to be elliptic, and an elliptic core optical fiber is obtained.

The polarization maintaining optical fiber is not required to have specifically desired dimensions in the final form of the elliptic core, and to say extremely, it is only required that the core is formed to be elliptic, not circular.

Since it is only required that a polarization maintaining optical fiber is made larger in the propagation constant difference between intrinsic cross polarization modes, it is not necessary to keep the ratio of the minor axis to the major axis of the elliptic core at any specific value in the production of the optical fiber It is only required that optical fibers constant in the form of the elliptic core can be produced as a result of grinding under constant conditions, using the original preforms designed to be dimensionally constant.

OBJECT OF THE INVENTION

Recently it is proposed to use a graded-index elliptic core optical fiber as a field distribution conversion optical fiber for decreasing the connection loss between a semiconductor laser and an optical fiber.

The field distribution conversion optical fiber is used to convert a sectionally elliptic spot beam into a sectionally circular spot beam for introducing a beam different in spreading angle between longitudinal direction and cross direction as in a semiconductor laser, into an optical fiber with a circular core, and in the optical fiber, the dimensions of the elliptic core must be strictly controlled for adaptation to the aspect ratio of the spot beam of the semiconductor laser used.

However, even if a original preform is simply ground along the parallel chords equally spaced from the central line of the original preform and drawn with heating, according to the above-mentioned conventional method, the elliptic core cannot be controlled to have desired dimensions.

Therefore in the conventional method, there is no other way than selecting elliptic core optical fibers with desired specific elliptic core dimensions from dimensionally various elliptic core optical fibers produced under different conditions, and if there is no elliptic core optical fiber with dimensions suitable for the properties of semiconductor lasers, those with dimensions close to the desired dimensions must be used, in which case light loss cannot be sufficiently decreased.

Moreover, in the conventional method, even if it is attempted to produce an elliptic core optical fiber with desired dimensions, the form of the processed preform cannot be specified. To specify the form of the processed preform for obtaining an elliptic core optical fiber with desired dimensions, variously formed preforms must be produced and used to experimentally produce elliptic core optical fibers, for measuring the respective dimensions, and these trials and errors are very wasteful disadvantageously.

The object of this invention is to solve this problem and to ensure that an elliptic core optical fiber with desired dimensions can be produced reliably and easily.

SUMMARY OF THE INVENTION

To solve the problem, the present invention proposes a method of producing an elliptic core optical fiber, in which a original preform having a circular core disposed at the center of a circular clad is processed to flatten on its periphery to form a processed preform that is then drawn with heating into an elliptic core optical fiber, characterized in that the aspect ratio of the processed preform for obtaining the desired aspect ratio of the elliptic core of the elliptic core optical fiber is obtained from the correlation between the aspect ratios of preforms and the aspect ratios of elliptic cores, which correlation is obtained for the material of the processed preform and the conditions of the drawing with heating; the core radius/clad radius ratio of the original preform for obtaining the desired core area/(core+clad) area ratio of the elliptic core optical fiber is obtained from the correlation between the aspect ratios and core area/(core+clad) area ratios of processed preforms, which correlation is obtained with the core radius/clad radius ratio as a parameter, and the original preform with the obtained core radius/clad radius ratio is processed to form the processed preform with said aspect ratio.

As described above, according to the method comprising the steps of processing the periphery of a original preform having a circular core disposed at the center of a circular clad, for obtaining a processed preform, and drawing it with heating, to spin an optical fiber from the tip of the molten processed preform, the molten flat portions are swollen relatively to circular arc portions due to the surface tension acting on the surface of the molten optical fiber, to make the clad sectionally circular as a whole, and accordingly, the circular core is deformed to be elliptic, to present an elliptic core optical fiber. Therefore, the aspect ratio of the elliptic core of the produced elliptic core optical fiber changes depending on the aspect ratio of the processed preform. That is, there is a specific correlation between them.

On the other hand, when a certain original preform with a specific core radius/clad radius ratio is processed to obtain a processed preform, the core area/(core+clad) area ratio of the processed preform changes in relation with the aspect ratio, that is, there is a specific correlation between them. Furthermore, it can be considered that the core area/(core+clad) area ratio before the spinning is basically maintained still after the spinning.

Consequently, the core radius/clad radius ratio of the original preform for obtaining the desired core area/(core+clad) area ratio of the elliptic core optical fiber can be obtained from the correlation between the aspect ratios and core area/(core+clad) area ratios of processed preforms, obtained with the core radius/clad radius ratio as a parameter.

Therefore, in the case where an elliptic core optical fiber with a desired core area/(core+clad) area ratio and having an elliptic core with a desired aspect ratio is produced, at first the aspect ratio of the processed preform for obtaining the desired aspect ratio of the elliptic core can be obtained from the correlation between the aspect ratios of processed preforms and the aspect ratios of elliptic cores of elliptic core optical fibers, and then the core radius/clad radius ratio of the original preform to be processed into the processed preform with a core area/(core+clad) area ratio equal to the desired core area/(core+clad) area ratio of the elliptic core optical fiber can be obtained from the correlation between the aspect ratios and core area/(core+clad) area ratios of processed preforms, obtained with the core radius/clad radius ratio of the original preform as a parameter. Thus, the original preform for producing an elliptic core optical fiber with a desired core area/(core+clad) area ratio and having an elliptic core with a desired aspect ratio can be specified. Furthermore, the dimensions of the processed preform to be obtained from said original preform can be specified.

The above-mentioned correlations, i.e., the correlation between the aspect ratios of processed preforms and the aspect ratios of elliptic cores of elliptic core optical fibers, and the correlation between the aspect ratios and core area/(core+clad) area ratios of processed preforms, obtained with the core radius/clad radius ratio of the original preform as a parameter are considered to remain the same if the material of the optical fiber and the conditions for drawing the processed preform with heating remain the same, though they can be different if the material and the drawing conditions are different.

Therefore, the present invention proposes a particular method for realizing the above method, in which the correlation between the aspect ratios of processed preforms and the aspect ratios of elliptic cores of elliptic core optical fibers, and the correlation between the aspect ratios and core area/(core+clad) area ratios of processed preforms, obtained with the core radius/clad radius ratio of the original preform as a parameter are obtained for the material of the optical fiber and the conditions of drawing the processed preform with heating, and stored beforehand; and the stored correlations are used to obtain the aspect ratio of the processed preform for obtaining the desired aspect ratio of the elliptic core, and the core radius/clad radius ratio of the original preform for obtaining the desired core area/(core+clad) area ratio of the elliptic core optical fiber.

This invention also proposes the above method, in which the respective correlations are stored as functional formulae or tables in a storage of a proper value derivation means, for example, a computer.

This invention also proposes the above method, in which the conditions of drawing the processed preform with heating are 2000 to 2300° C. in heating temperature and 10 to 100 m/min in drawing speed.

This invention also proposes the above method, in which the correlation between the aspect ratios of processed preforms and the aspect ratios of elliptic cores of elliptic core optical fibers is expressed by the following formula:

$$r/x = (a/b)^{1/n}$$

where, $r/x$ is the aspect ratio of a processed perform, r: clad radius, x: half width of the portion ground in parallel, $a/b$ is the aspect ratio of an elliptic core, a: semimajor axis, b: semiminor axis, and n is a selected value in a range of 1.6 to 2.4.

This invention also proposes the above method, in which the processed preform is formed by grinding the periphery of the clad of the original preform along the parallel chords equally spaced from the central line of the original preform. The core radius/clad radius ratio of the processed preform is expressed by the following formula in relation with the clad radius of the elliptic core optical fiber to be produced, and the semimajor axis and semiminor axis of the elliptic core:

$$c/r = [ab(\pi - 2\theta + 2\cos\theta \sin\theta)/(\pi f^2)]^{1/2}$$

where, for the elliptic core optical fiber, f: clad radius, a: semimajor axis, b: semiminor axis; and for the original preform, c: core radius, r: clad radius, x: half width of the portion ground in parallel, $$\theta = \arccos(x/r).$$

Furthermore, in this invention, the processed preform can be obtained by grinding the angles corresponding to the ends of the chords on both sides to be flat or curved.

In the above method of this invention, the processed preform can also be obtained by grinding the periphery of the clad of the original preform in an elliptic form.

This invention also proposes a processed preform used for producing an elliptic core optical fiber, which is used for a method of producing an elliptic core optical fiber comprising the steps of processing to flatten the periphery of a original preform having a circular core disposed at the center of a circular clad, to form a processed preform, and drawing it with heating, characterized in that the aspect ratio of the processed preform is obtained from the correlation with the aspect ratio of the elliptic core of the elliptic core optical fiber; and the core radius/clad radius ratio of the original preform to be processed into the processed preform is obtained from the correlation between the aspect ratios and core area/(core+clad) area ratios of processed preforms, obtained with the core radius/clad radius ratio of the original preform as a parameter.

This invention also proposes said processed preform, in which the correlation between the aspect ratios of processed preforms and the aspect ratios of elliptic cores of elliptic core optical fibers is expressed by the following formula:

$$r/x=(a/b)^{1/n}$$

where, r/x is the aspect ratio of a processed perform, r: clad radius, x: half width of the portion ground in parallel, a/b is the aspect ratio of an elliptic core, a: semimajor axis, b: semiminor axis, and n is a selected value in a range of 1.6 to 2.4.

BRIEF DESCRIPTION OF THE DRAWINGS

The numerous objects and advantages of the present invention may be better understood by those skilled in the art by reference to the accompanying Figures, in which:

FIG. 3 is a table showing dimensionally various processed preforms used in the production method of this invention and elliptic core optical fibers produced from those processed preforms, as examples.

FIG. 5 is a graph for Δ1.5% GI elliptic core optical fibers, showing the correlation between the inverse number of the aspect ratio and core area/(core+clad) area ratio of each processed preform, with the core radius/clad radius ratio of the original preform as a parameter.

FIG. 6 is a graph for Δ2.0% GI elliptic core optical fibers, showing the correlation between the inverse number of the aspect ratio and core area/(core+clad) area ratio of each processed preform, with the core radius/clad radius ratio of the original preform as a parameter.

FIG. 7 is a table showing the intended dimensional parameters of elliptic core optical fibers and the dimensional parameters of the processed preforms specified for obtaining the optical fibers.

FIG. 8 is a table showing the dimensional parameters of the Δ1.5% elliptic core optical fiber produced.

DETAILED DESCRIPTION OF PREFERRED EMBODIMENTS

The grounds and modes for carrying out this invention are described below in reference to drawings.

Figure 1:
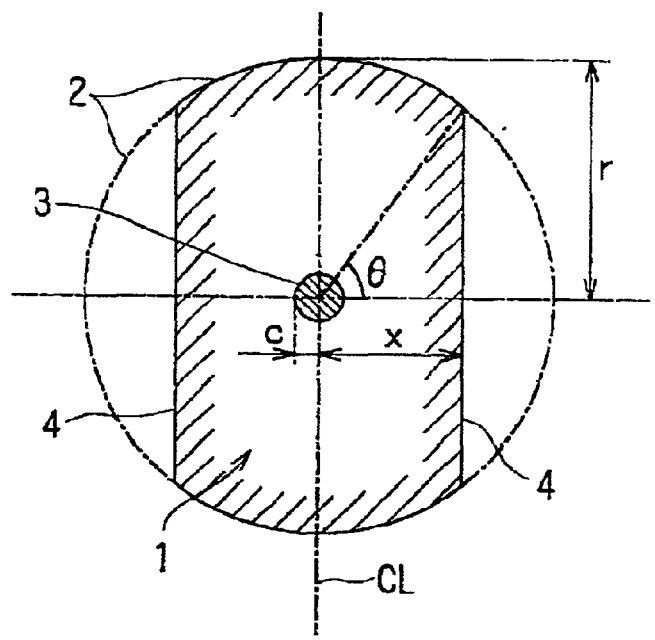
FIG. 1 is a sectional view showing conceptually an example of the processed preform, i.e., the processed preform used in the production method of this invention.
Figure 2:
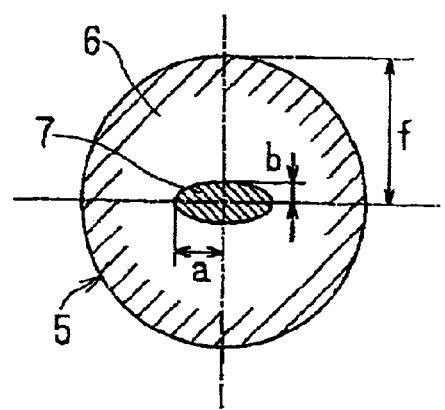
FIG. 2 is a sectional view showing conceptually an example of the elliptic core optical fiber produced according to the production method of this invention.

FIG. 1 is a sectional view showing conceptually the processed preform used in this invention, and FIG. 2 is a sectional view showing conceptually the elliptic core optical fiber produced by drawing the processed preform with heating.

A processed preform 1 shown in FIG. 1 has, for example, a graded-index circular core 3 disposed at the center of a circular clad 2 of the original preform indicated by a one-dot-dash line in the drawing, and the periphery is grounded along the parallel chords 4 and 4 equally spaced by x from the central line CL of the original preform. Symbol r indicates the clad radius of the original preform, or processed preform 1; c, the core radius; and x, the half width of the portion ground in parallel (half of the distance between the parallel chords).

The processed preform 1 formed like this is drawn with heating to spin an optical fiber from the tip of the molten processed preform, and the ground surfaces are swollen relatively to the circular arc portions due to the surface tension acting on the surface of the clad in the molten portions, to make the clad 6 sectionally circular as a whole, and accordingly, the circular core 3 that has been circular in the processed preform 1 is deformed to be elliptic, to form an elliptic core 7 at the center of the clad 6.

Symbol f indicates the radius of the clad 6 of the elliptic core optical fiber 5 in this state; a, the semimajor axis of the elliptic core 7; and b, the semiminor axis.

Figure 4:
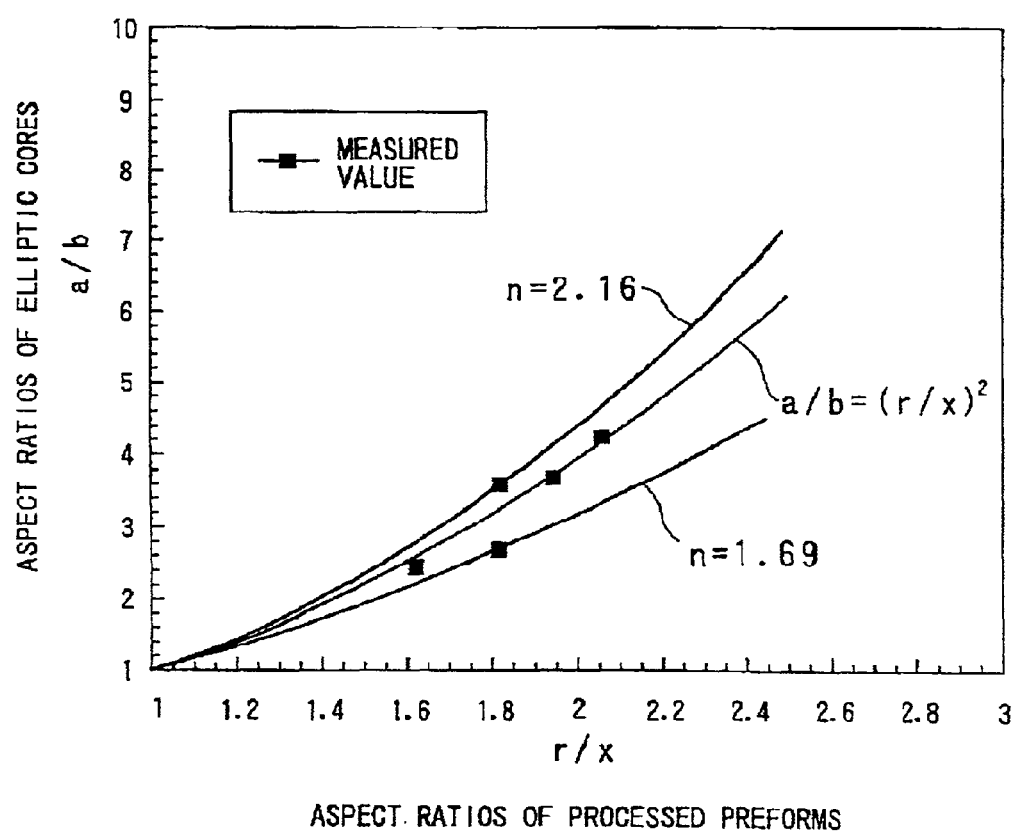
FIG. 4 is a graph showing the correlation between the aspect ratios of processed preforms and the aspect ratios of elliptic core optical fibers obtained based on the production examples shown in FIG. 3.

FIG. 3 shows respective values of elliptic core optical fibers experimentally produced by drawing dimensionally various processed preforms 1. FIG. 4 shows measured values of produced elliptic core optical fibers as relation between the aspect ratio of each processed preform 1, i.e., the ratio of clad radius r to parallel section half width x: (r/x) chosen as the abscissa and the aspect ratio of each elliptic core 7, i.e., the ratio of semimajor axis a to semiminor axis b: (a/b) chosen as the ordinate.

In the above experimental production, the conditions for drawing the processed preforms 1 with heating were 2000 to 2300° C. in heating temperature and 10 to 100 m/min in drawing speed.

From the results, it was found that the correlation between the aspect ratios of elliptic cores 7 (a/b) and the aspect ratios of processed preform 1 (r/x) could be expressed by the following formula:

$$(a/b)=(r/x)^n$$

As shown in FIG. 4, in the results of experimental production, it was found that n could be any value within a range of 1.6 to 2.4. The value n is different depending on the material of the optical fiber and the conditions of drawing with heating, and it can be considered that n is constant with the same material under the same drawing conditions.

From the above description, in the above conditions of experimental production, it can be seen that in the case where an elliptic core optical fiber having an elliptic core with a desired aspect ratio is produced, the aspect ratio of the processed preform 1 can be obtained from the following correlation:

$$r/x=(a/b)^{1/n} \qquad (1)$$

where n is a value in a range of 1.6 to 2.4 as described above, and the value is selected in relation to the material of the optical fiber and the conditions of drawing with heating.

FIGS. 5 and 6 show the correlations between the aspect ratios and core area/(core A clad) area ratios of processed performs, with the inverse number of the aspect ratio of each processed preform (x/r) chosen as the abscissa and the core area/(core+clad) area ratio as the ordinate in the production of elliptic core optical fibers 5 having a diameter of 125 μm, with the core radius/clad radius ratio as a parameter. These correlations can be theoretically obtained by means of calculation as described later. FIGS. 5 and 6 show the results of graded index (GI) elliptic core optical fibers of Δ1.5%, Δ2.0% respectively.

As shown in FIGS. 5 and 6, in the case where a processed preform 1 is obtained by processing a original preform with a certain core radius/clad radius ratio, it can be seen that the core area/(core+clad) area ratio changes in relation with the aspect ratio, or that there exists a specific correlation between them. On the other hand, as described before, since it can be considered that the core area/(core+clad) area ratio before said spinning is basically maintained still after said spinning, as shown in FIGS. 5 and 6, the core radius/clad radius ratio of the processed preform 1 for obtaining the desired core area/(core+clad) area ratio of the elliptic core optical fiber can be obtained from the correlation between the aspect ratios and core area/(core+clad) area ratios of processed preforms 1, obtained with the core radius/clad radius ratio as a parameter.

The above relations are described below using formulae.

In FIG. 1, if the angle formed between the radius perpendicular to one of the chords 4 of the processed preform 1 and the radius passing through an end point of the chord 4 is θ, the sectional area Sp of the processed preform 1, the sectional area Sc of the core, the sectional area Sf of the elliptic core optical fiber 5 to be produced, and the sectional area Sc of the elliptic core can be respectively expressed as follows:

$$Sp = r^2(\pi - 2\theta + 2 \cos \theta \sin \theta) \quad (3)$$

$$Sc = \pi c^2 \quad (4)$$

$$Sf = \pi f^2 \quad (5)$$

$$Sab = \pi ab \quad (6)$$

On the other hand, if it is assumed that the core area/(core+clad) area ratio before said spinning is maintained still after said spinning as described before, the following formula holds.

$$Sc/Sp = Sab/Sf \quad (2)$$

From the above formulae (2) through (6), the core radius/clad radius ratio (c/r) of the processed preform can be expressed as follows.

$$c/r = [ab(\pi - 2\theta + 2 \cos \theta \sin \theta)/(\pi f^2)]^{1/2} \quad (7)$$

(where θ=arc cos (x/r))

As described above, in the case where an elliptic core optical fiber with a desired core area/(core+clad) area ratio and having an elliptic core with a desired aspect ratio is produced, at first, the aspect ratio of the processed preform 1 for obtaining the desired aspect ratio of the elliptic core 7 can be obtained from the formula (1) obtained from the correlation between the aspect ratios of processed preforms (r/x) and the aspect ratios of elliptic cores 7 of elliptic core optical fibers 5 (a/b) shown in FIG. 4, and then the core radius/clad radius ratio of the original preform to be processed into the processed preform 1 with said aspect ratio and a core area/(core+clad) area ratio equal to the desired core area/(core+clad) area ratio of the elliptic core optical fiber 5 can be obtained from the correlation between the aspect ratios and core area/(core+clad) area ratios of processed preforms 1 shown in FIGS. 5, 6 or formula (7). In this way, the original preform for producing the elliptic core optical fiber 5 with a desired core area/(core+clad) area ratio and having an elliptic core 7 with a desired aspect ratio can be specified, and furthermore, the dimensions of the processed preform 1 obtained from said original preform can be specified.

In the above description, it is assumed that the core area/(core+clad) area ratio before said spinning is maintained still after said spinning. However, in the case where the core area/(core+clad) area ratio changes under certain production conditions, the core area/(core+clad) area ratio change rate under said certain conditions can be specifically taken into account in the dimensions of the processed preform.

An example of the procedure for specifying the dimensions of the processed preform 1 described above is described below.

FIG. 7 shows the intended dimensional parameters of elliptic core optical fibers 5 and the dimensional parameters of the processed preforms 1 specified for producing the elliptic core optical fibers 5. In this example of procedure, as shown in the table, for each elliptic core optical fiber 5, obtained are the core area/(core+clad) area ratio obtained on the right side of formula (2) and the value of the core area/(core+clad) area ratio/0.9. The former core area/(core+clad) area ratio corresponds to a case where the core area/(core+clad) area ratio before said spinning does not change still after said spinning, and the latter core area/(core+clad) area ratio corresponds to a case where the core area/(core+clad) area ratio before said spinning decreases by 10% compared with that after said spinning. Furthermore, for the processed preform 1, the inverse number of aspect ratio is obtained as the inverse number of said formula (1). In this case, said value n is selected and set at 2.0.

At first, for the elliptic core optical fiber of Δ1.5% or Δ2.0% among the intended dimensional parameters, the inverse number of the aspect ratio (x/r=0.537) of the processed preform 1 is obtained from the inverse number of formula (1) for the aspect ratio of the elliptic core 5 (a/b=3.47). Then, in FIG. 5 or 6, a original preform is selected in a range between the core radius/clad radius ratios at the intersections between the perpendicular line corresponding to the inverse number of the aspect ratio (x/r=0.537) and the horizontal lines of said core area/(core+clad) area ratio and said core area/(core+clad) area ratio/0.9. That is, in the case of Δ1.5% elliptic core optical fiber, a original preform of core area/(core+clad) area ratio=16/125 is selected from FIG. 5, and it is ground to have the derived aspect ratio, i.e. r/x=(x/r)⁻¹=1.86 In the case of Δ2.0% elliptic core optical fiber, a original preform of core/(core+clad) area ratio =19/125 is selected from FIG. 6, and it is ground to have the derived aspect ratio, to form a processed preform.

In the example of the procedure explained above, the core radius/clad radius ratio of the original perform to form the processed perform is selected out of prepared ratios which change gradually.

But in the following example, the core radius/clad radius ratio of original preform is obtained directly from formula (7).

As another example, in the production of an elliptic core optical fiber with clad radius f=62.5 μm, elliptic core semimajor axis a=19.8 μm, semiminor axis b=5.4 μm and aspect ratio a/b=3.67, the value n is selected and set at 2.15 correspond to the value with the same material under the same drawing condition in said formula (1).

The ratio x/r of the half width x of the portion ground in parallel to the clad radius r, i.e., the inverse number of the aspect ratio of the processed preform is obtained from formula (1) as follows.

$$x/r=0.5464$$

The core radius/clad radius ratio is obtained from formula (7) as follows.

$$c/r=0.1343$$

From these values, it can be seen that in the case of a processed preform 1 having a clad radius of r=11.47 mm, the processed preform used is required to have a core radius of c=1.54 mm and a half width of x =6.27 mm in the portion ground in parallel.

When the processed preform 1 was spun according to the method described above to have a clad radius of f=62.5 μm, the elliptic core optical fiber obtained was 19.7 μm in the semimajor axis a of the elliptic core, 5.4 μm in the semiminor axis b, and 3.65 in the aspect ratio a/b, as shown in FIG. 8.

Namely, FIG. 8 shows the results of a Δ1.5% elliptic core optical fiber experimentally produced from the processed preform specified as described above. As can be seen from the results of experimental production, the aspect ratio (a/b=3.65) of the elliptic core 5 has an error of only about 0.5% against the intended aspect ratio (a/b=3.67), and the core area/(core+clad) area ratio (=0.02736) of the processed preform was almost equal to the ratio (=0.02735) of the elliptic core optical fiber.

As shown above, the dimensions of the obtained elliptic core optical fiber were almost equal to the intended dimensions, and it was confirmed that an elliptic core optical fiber as designed could be obtained.

The processed preform described above is obtained by grinding the periphery of the circular clad 2 of a circular original preform along the parallel chords 4 and 4 equally spaced from the central line of the original preform. The processed preform 1 can also be formed as shown in FIGS. 9 and 10.

Figure 9:
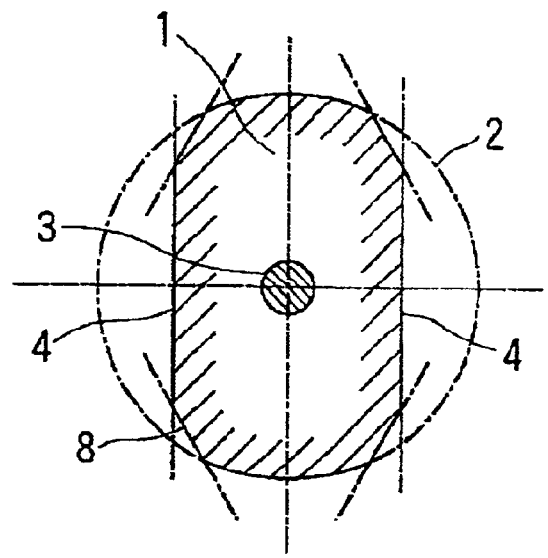
FIG. 9 is a sectional area showing conceptually another example of the processed preform used in the production method of this invention.

The processed preform 1 shown in FIG. 9 is obtained by grinding the periphery of the circular clad 2 of a circular preform along the parallel chords 4 and 4 equally spaced from the central line of the original preform like the one shown in FIG. 1 and chamfering the corners corresponding to the ends of the chords 4 and 4 on both sides to have flat faces 8. As a further other example, the flat faces 8 obtained by chamfering the corners can also be curved faces like cylindrical faces.

Figure 10:
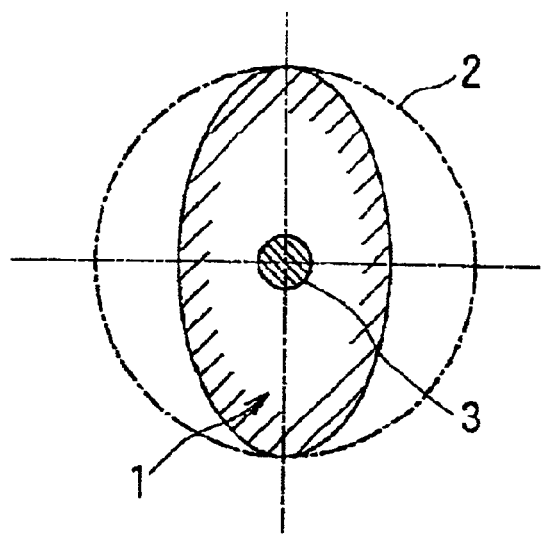
FIG. 10 is a sectional area showing conceptually a further other example of the processed preform used in the production method of this invention.

The processed preform 1 shown in FIG. 10 is obtained by chamfering the periphery of the clad of the circular preform in an elliptical form.

Irrespective of the types of the processed preforms described above is adopted, for each type, the correlation between the aspect ratios of processed preforms and the aspect ratios of elliptic cores of elliptic core optical fibers, and the correlation between the aspect ratios of processed preforms and core area/(core+clad) area ratios of preforms with the core radius/clad radius ratio as a parameter can be stored from the results of numerous production tests using the optical fiber material concerned under the conditions used for drawing the processed preform. Then, the aspect ratio of the processed preform for obtaining the desired aspect ratio of the elliptic core, and the core radius/clad radius ratio of the original preform for obtaining the desired core area/(core+clad) area ratio of the elliptical core optical fiber can be obtained from the stored respective correlations.

In this case, the respective correlations can be stored as functional formula or as tables.

The elliptic core optical fiber described above in detail, to which the production method of this invention can be applied, can be used as a field distribution conversion optical fiber for introducing a flat laser beam of a semiconductor laser into a single-mode optical fiber having a circular core as described before, but it can also be used as an elliptic core optical fiber having an elliptic core for any other application.

INDUSTRIAL APPLICABILITY

As described above, this invention provides a method of producing an elliptic core optical fiber comprising the steps of processing the periphery of a original preform having a circular core disposed at the center of a circular clad, to obtain a processed preform, and drawing it with heating. According to this method, the form of the processed preform used for producing an elliptic core optical fiber with desired specific dimensions can be designed using pre-obtained correlations based on the dimensions of the elliptic core optical fiber. If the processed preform designed like this is drawn with heating, an elliptic core optical fiber with desired specific dimensions can be reliably and easily produced.

What is claimed is:

1. A method of producing an elliptical core optical fiber comprising:

providing an original preform having a circular core disposed at the center of a circular clad, processing the original preform to form a processed preform, drawing with heat the processed preform into an elliptic core optical fiber, obtaining a predetermined aspect ratio of the processed preform from the correlation between an aspect ratio of the processed preform and aspect ratio of the elliptical core of the optical fiber wherein said correlation is obtained for the material of the processed preform and drawing conditions, obtaining a predetermined core area to the sum of the core area and clad area ratio of the elliptic optical fiber from the correlation between the aspect ratio of the processed preform and a ratio of the core area to the sum of the core and clad area of the processed preform is obtained with the ratio of the core radius of the original preform, and wherein the processing of said original preform is derived from the obtained predetermined core area to the sum of the core area and clad area ratio of the elliptical optical fiber and the obtained aspect ratio.

2. The method of producing an elliptic core optical fiber according to claim 1, wherein the correlation between the aspect ratio of the processed preform and the aspect ratio of elliptic cores of elliptic core optical fibers, and the correlation between the aspect ratios and core area/(core+clad) area ratios of the processed preform, obtained with the core radius/clad radius ratio as a parameter, are obtained for the material of the optical fiber and the conditions of drawing the processed preform with heating, and stored beforehand; and the stored correlations are used to obtain an aspect ratio of the processed preform for obtaining a desired aspect ratio of the elliptic core, and the core radius/clad radius ratio of the original preform for obtaining the desired core area/(core+clad) area ratio of the elliptic core optical fiber.

3. The method of producing an elliptic core optical fiber according to claim 2, wherein the respective correlations are stored as functional formulae.

4. The method of producing an elliptic core optical fiber according to claim 2, wherein the respective correlations are stored as tables.

5. The method of producing an elliptic core optical fiber according to claim 1, wherein the conditions of drawing the processed preform with heating are 2000 to 2300° C. in heating temperature, and 10 to 100 m/min in drawing speed.

6. The method of producing an elliptic core optical fiber according to claim 1, wherein the correlation between the aspect ratio of the processed preform and the aspect ratio of the elliptic core of the elliptic core optical fiber is expressed by the following formula:

$$r/x=(a/b)^{1/n}$$

where r/x is the aspect ratio of a processed perform, r: clad radius, x: half width of a portion of the elliptic core optical fiber ground in parallel, a/b is the aspect ratio of an elliptic core, a: semimajor axis, b: semiminor axis, and n is a selected value in a range of 1.6 to 2.4.

7. The method of producing an elliptic core optical fiber according to claim 1, wherein the processed preform is obtained by grinding the periphery of the clad of the original preform along the parallel chords equally spaced from the central line of the original preform.

8. The method of producing an elliptic core optical fiber according to claim 7, wherein the core radius/clad radius ratio of the original preform is expressed by the following formula in relation with the clad radius of the elliptic core optical fiber to be produced, and the semimajor axis and semiminor axis of the elliptic core:

$$c/r=[ab(\Pi-2\theta+2\cos\theta\sin\theta)/(\Pi f^2)]^{1/2}$$

where, for the elliptic core optical fiber, f: clad radius, a: semimajor axis, b: semiminor axis; and for the original preform, c: core radius, r: clad radius, x: half width of the portion ground in parallel, $$\theta=\arccos(x/r).$$

9. The method of producing an elliptic core optical fiber according to claim 1, wherein the processed preform is obtained by grinding the periphery of the clad of the original preform along parallel chords equally spaced from a central line of the original preform, and angles at ends of the chords on both sides of the elliptic core are ground to be flat or curved.

10. The method of producing an elliptic core optical fiber according to claim 1, wherein the processed preform is obtained by grinding the periphery of the clad of the original preform so as to form an elliptical form.

11. The method of producing an elliptic core optical fiber according to claim 2, wherein the conditions of drawing the processed preform with heating are 2000 to 2300° C. in heating temperatures and 10 to 100 m/min in drawing speed.

12. The method of producing an elliptic core optical fiber according to claim 3, wherein the conditions of drawing the processed preform with heating are 2000 to 2300° C. in heating temperatures and 10 to 100 m/min in drawing speed.

13. The method of producing an elliptic core optical fiber according to claim 4, wherein the conditions of drawing the processed preform with heating are 2000 to 2300° C. in heating temperatures and 10 to 100 m/min in drawing speed.

14. The method of producing an elliptical core optical fiber according to claim 2, wherein the correlation between the aspect ratio of the processed preform and the aspect ratio of the elliptic core of the elliptic-core optical fiber is expressed by the following formula:

$$r/x=(a/b)^{1/n}$$

where r/x is the aspect ratio of a processed perform, r: clad radius, x: half width of a portion of the elliptic core optical fiber ground in parallel, a/b is the aspect ratio of an elliptic core, a: semimajor axis, b: semiminor axis, and n is a selected value in a range of 1.6 to 2.4.

15. The method of producing an elliptic core optical fiber according to claim 3, wherein the correlation between the aspect ratio of the processed preform and the aspect ratio of the elliptic core of the elliptic-core optical fiber is expressed by the following formula:

$$r/x=(a/b)^{1/n}$$

where r/x is the aspect ratio of a processed perform, r: clad radius, x: half width of a portion of the elliptic core optical fiber ground in parallel, a/b is the aspect ratio of an elliptic core, a: semimajor axis, b: semiminor axis, and n is a selected value in a range of 1.6 to 2.4.

16. The method of producing an elliptic core optical fiber according to claim 4, wherein the correlation between the aspect ratio of the processed preform and the aspect ratios ratio of the elliptic core of the elliptic-core optical fiber is expressed by the following formula:

$$r/x=(a/b)^{1/n}$$

where r/x is the aspect ratio of a processed perform, r: clad radius, x: half width of a portion of the elliptic core optical fiber ground in parallel, a/b is the aspect ratio of an elliptic core, a: semimajor axis, b: semiminor axis, and n is a selected value in a range of 1.6 to 2.4.

17. The method of producing an elliptic core optical fiber according to claim 5, wherein the correlation between the aspect ratio of the processed preform and the aspect ratio of the elliptic core of the elliptic-core optical fiber is expressed by the following formula:

$$r/x=(a/b)^{1/n}$$

where r/x is the aspect ratio of a processed perform, r: clad radius, x: half width of a portion of the elliptic core optical fiber ground in parallel, a/b is the aspect ratio of an elliptic core, a: semimajor axis, b: semiminor axis, and n is a selected value in a range of 1.6 to 2.4.

18. The method of producing an elliptic core optical fiber according to claim 2, wherein the processed preform is obtained by grinding the periphery of the clad of the original preform along parallel chords equally spaced from a central line of the original preform.

19. The method of producing an elliptic core optical fiber according to claim 3, wherein the processed preform is obtained by grinding the periphery of the clad of the original preform along parallel chords equally spaced from a central line of the original preform.

20. The method of producing an elliptic core optical fiber according to claim 4, wherein the processed preform is obtained by grinding the periphery of the clad of the original preform along parallel chords equally spaced from a central line of the original preform.

21. The method of producing an elliptic core optical fiber according to claim 5, wherein the processed preform is obtained by grinding the periphery of the clad of the original preform along parallel chords equally spaced from a central line of the original preform.

22. The method of producing an elliptic core optical fiber according to claim 5, wherein the processed preform is obtained by grinding the periphery of the clad of the original preform along parallel chords equally spaced from a central line of the original perform.

23. The method of producing an elliptic core optical fiber according to claim 2, wherein the processed preform is obtained by grinding the periphery of the clad of the original preform along parallel chords equally spaced from a central line of the original preform, and angles at ends of the parallel chords on both sides of the elliptic core are ground to be flat or curved.

24. The method of producing an elliptic core optical fiber according to claim 3, wherein the processed preform is obtained by grinding the periphery of the clad of the original preform along parallel chords equally spaced from a central line of the original preform, and angles at ends of the parallel chords on both sides of the elliptic core are ground to be flat or curved.

25. The method of producing an elliptic core optical fiber according to claim 4, wherein the processed preform is obtained by grinding the periphery of the clad of the original preform along parallel chords equally spaced from a central line of the original preform, and angles at ends of the parallel chords on both sides of the elliptic core are ground to be flat or curved.

26. The method of producing an elliptic core optical fiber according to claim 5, wherein the processed preform is obtained by grinding the periphery of the clad of the original preform along parallel chords equally spaced from a central line of the original preform, and angles at ends of the parallel chords on both sides of the elliptic core are ground to be flat or curved.

27. The method of producing an elliptic core optical fiber according to claim 6, wherein the processed preform is obtained by grinding the periphery of the clad of the original preform along parallel chords equally spaced from a central line of the original preform, and angles at ends of the parallel chords on both sides of the elliptic core are ground to be flat or curved.

28. The method of producing an elliptic core optical fiber according to claim 2, wherein the processed preform is obtained by grinding the periphery of the clad of the original preform so as to form an elliptical form.

29. The method of producing an elliptic core optical fiber according to claim 3, wherein the processed preform is obtained by grinding the periphery of the clad of the original preform so as to form an elliptical form.

30. The method of producing an elliptic core optical fiber according to claim 4, wherein the processed preform is obtained by grinding the periphery of the clad of the original preform so as to form an elliptical form.

31. The method of producing an elliptic core optical fiber according to claim 5, wherein the processed preform is obtained by grinding the periphery of the clad of the original preform so as to form an elliptical form.

32. The method of producing an elliptic core optical fiber according to claim 6, wherein the processed preform is obtained by grinding the periphery of the clad of the original preform so as to form an elliptical form.

* * * * *